UNITED STATES PATENT OFFICE 2,670,374

N - DIALKYLAMINOALKYL AMINOBENZ-ANILIDES AND N - ARALKYLAMINO-BENZAMIDES AND THEIR SALTS

John W. Cusic, Skokie, Ill., assignor to G. D. Searle & Co., Chicago, Ill., a corporation of Illinois No Drawing. Application May 17, 1952, Serial No. 288,547

10 Claims. (Cl. 260—558)

The present invention relates to a new group of organic compounds and in particular to aminobenzamides substituted at the amido nitrogen by an aromatic hydrocarbon radical as well as a basically substituted alkyl radical. The amides of my invention can be represented as the bases of the general structural formula

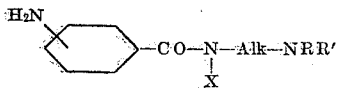

and salts thereof, wherein Alk is a lower bivalent aliphatic hydrocarbon radical containing at least two carbon atoms, NRR' is either a lower dialkylamino radical or a heteromonocyclic radical attached to the Alk radical through a nitrogen in the heteromonocycle, and X is an aromatic radical selected from the class consisting of aryl hydrocarbon radicals and aralkyl hydrocarbon radicals.

In the foregoing structural formula the bivalent radical Alk is a straight chain or branched chain lower alkylene radical such as ethylene, propylene, butylene, amylene, hexylene, or a polymethylene radical such as trimethylene, tetramethylene, pentamethylene and hexamethylene. Among the radicals which R and R' can represent are such lower aliphatic groups as methyl, ethyl, propyl, butyl, amyl and hexyl, wherein the propyl, butyl, amyl and hexyl groups may be either of the straight chain or branched chain type. In addition the radicals R and R' can be saturated nitrogen-containing heteromonocyclic groups attached to the radical Alk through a nitrogen in the heteromonocycle and of special interest are those radicals in which R and R' are combined to form an ethyleneoxyethylene radical or a lower alkylene radical of 4 to 7 carbon atoms containing 4 to 5 carbon atoms in nuclear position as in the case of the pyrrolidino, piperidino, dimethylpyrrolidino, and 2,6-lupetidino radicals. The radical X above represents an aromatic hydrocarbon radical of 6 to 10 carbon atoms; examples for such radicals are phenyl, naphthyl, such lower alkylated phenyls as tolyl, xylyl, cumyl, and such lower aralkyl radicals as benzyl, phenethyl, phenylpropyl, phenylbutyl, tolylmethl, xylylethyl and the like. In addition X can also represent a lower cycloalkyl radical containing 5 to 6 nuclear carbon atoms such as cyclopentyl and cyclohexyl.

The organic bases of the foregoing type form acid addition salts with a variety of nontoxic, inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl chloride, isobutyl chloride, benzyl chloride, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

It is the object of this invention to provide new chemical substances of the type indicated hereinabove. These new substances possess a number of highly useful therapeutic properties. Thus the bases and their simple addition salts produce a valuable effect on the cardiovascular system and particularly on the kidney producing an improved excretion not only of water but also of sodium in edematous conditions.

The following examples illustrate in detail certain of the compounds which constitute this invention and methods for preparing the same. However this invention is not to be construed as limited thereby in spirit or in scope since it will be apparent to organic chemists that many modifications in materials and methods may be practiced without departing from the invention. In each of these examples temperatures are given in degrees centigrade (° C.), relative amounts of materials in parts by weight, and pressures during distillations in millimeters (mm.) of mercury.

EXAMPLE 1

*N-(β-diethylaminoethyl)-p-aminobenzanilide*

A solution of 576 parts of N-(β-diethylaminoethyl) aniline in 4000 parts of butanone is stirred and treated by gradual addition with 556 parts of p-nitrobenzoyl chloride. The resulting clear solution is heated at reflux temperature for 3 hours, treated with ethanol to destroy the unreacted acid chloride, concentrated and treated with water. The aqueous layer is separated, washed with ether, rendered alkaline by addition of ammonium hydroxide and extracted with ether. This ether extract is dried over anhydrous potassium carbonate, filtered and evaporated, leaving as a residue the N-(β-diethylaminoethyl)-p-nitrobenzanilide as a viscous brown oil.

A solution of 341 parts of this base in 800 parts of ethanol is stirred with charcoal, filtered and treated with 5 parts of platinum dioxide. The mixture is hydrogenated in a Parr medium pressure bomb at 45–25 pounds pressure for 100 minutes and then filtered. Vacuum distillation of the filtrate yields the N-(β-diethylaminoethyl)-p-aminobenzanilide as a very viscous oil at 225–228° C. and 2 mm. pressure. Treatment of an ether solution of this base with alcoholic hydrogen chloride yields the dihydrochloride which, recrystallized from ethyl acetate with charcoal decolorization, melts at about 182–183° C. This salt has the structural formula

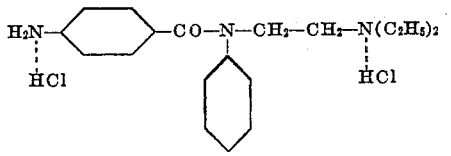

EXAMPLE 2

N - (δ - dimethylaminobutyl) - N - (1 - naphthyl) - o - aminobenzamide

A suspension of 215 parts of 1-naphthylamine, 172 parts of δ-chlorobutyldimethylamine hydrochloride, 311 parts of anhydrous potassium carbonate and 5 parts of copper bronze powder in 800 parts of benzene is heated at reflux for 11 hours with stirring, cooled and treated with 1400 parts of a 10% sodium hydroxide solution. The reaction mixture is extracted with ether and the extract is washed with water and saturated sodium chloride solution, dried over anhydrous sodium sulfate, filtered and ether stripped in vacuo. The resulting N-(δ-dimethylaminobutyl)-1-naphthylamine is distilled at about 152–162° C. and 1 mm. pressure.

A solution of 242 parts of the distillate in 1500 parts of xylene is stirred and treated with 186 parts of p-nitrobenzoyl chloride and heated at reflux temperature for 3 hours. The unreacted portion of the acid chloride is decomposed by addition of ethanol after which the reaction mixture is extracted with dilute hydrochloric acid. The acidic extract is rendered alkaline and extracted with ether. This ether extract is stirred with charcoal, filtered and ether stripped in vacuo to yield the N-(δ-dimethylaminobutyl)-N-(1-naphthyl)-o-nitrobenzamide as an oil. 100 parts of this oil are hydrogenated with one part of platinum dioxide in 30 parts of ethanol in a low pressure Parr bomb at 25 pounds pressure for an hour, after which the contents of the bomb are filtered. The filtrate is treated with ether and benzene and extracted with dilute hydrochloric acid. The extract is washed with ether, rendered alkaline by addition of potassium hydroxide, stirred with charcoal, filtered and evaporated to yield the N-(δ-dimethylaminobutyl)-N-(1-naphthyl)-o-aminobenzamide as a highly viscous, orange oil which has the structural formula

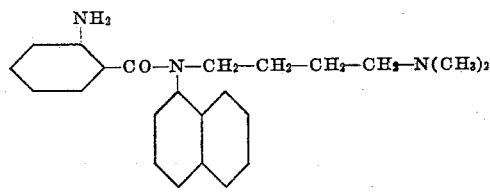

EXAMPLE 3

N - (β - diethylaminoethyl) - N - benzyl - p-aminobenzamide

A solution of 416 parts of N-(β-diethylaminoethyl)-benzylamine in 2400 parts of butanone is stirred with 420 parts of p-nitrobenzoyl chloride with cooling to control the initial vigorous reaction which is completed by heating at reflux temperature for 2 hours. The excess of acid chloride is decomposed by addition of ethanol. On cooling a heavy precipitate forms which is collected on a filter and recrystallized from dilute isopropanol, using charcoal decolorization.

195 parts of the hydrochloride of N-(β-diethylaminoethyl)-N-benzyl-p-nitrobenzamide thus obtained are dissolved in 750 parts of water and 550 parts of ethanol and hydrogenated with 2 parts of platinum dioxide for 80 minutes at 40 pounds pressure in a bomb. The bomb contents are then filtered and solvent stripped in vacuo. The resulting glassy residue is dissolved in water and extracted with ether. This extract is dried over anhydrous potassium carbonate, filtered and evaporated to yield the N-(β-diethylaminoethyl)-N-benzyl-p-aminobenzamide as an oil which distils at about 229–230° C. and 1 mm. pressure. It has the structural formula

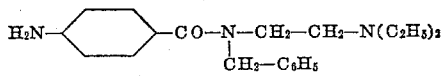

EXAMPLE 4

N - (β - dimethylaminopropyl) - N - (p-methylbenzyl) - m - aminobenzamide

A solution of 370 parts of p-methylbenzyl chloride and 510 parts of β-aminopropyldimethylamine in 1800 parts of toluene is heated at reflux temperature for 24 hours. The resulting mixture is extracted with dilute hydrochloric acid and the aqueous layer is separated, rendered alkaline by addition of dilute sodium hydroxide and extracted with ether. This ether extract is dried over anhydrous calcium sulfate, filtered and evaporated. The N,N - (β - dimethylaminopropyl) - p - methylbenzylamine is distilled at about 100–107° C. and 1.3 mm. pressure. A solution of 208 parts of this amine in 1200 parts of butanone is stirred with 210 parts of m-nitrobenzyl chloride and, after subsidance of the initial reaction, the mixture is heated at reflux temperature for 3 hours. The excess of the acid chloride is then decomposed with ethanol and the reaction mixture is extracted with dilute hydrochloric acid. The extract is rendered alkaline by addition of ammonium hydroxide and extracted with ether. This ether extract is dried over anhydrous potassium carbonate, filtered and evaporated to yield the N - (β - dimethylaminopropyl) - N - (p - methylbenzyl)-m-nitrobenzamide as a brown oil. A solution of 200 parts of this oil in 600 parts of ethanol is hydrogenated with 2 parts of platinum dioxide at 30 pounds pressure in the course of an hour and filtered. The filtrate is treated with ether and benzene and then with dilute aqueous hydrochloric acid. The aqueous layer is separated, washed with ether, rendered alkaline and extracted with ether. This extract is dried over anhydrous calcium sulfate, filtered and evaporated to yield the N-(β-dimethylaminopropyl)-N-(p-methylbenzyl)-m-aminobenzamide as an oil which is distilled at about 225–230° C. and 0.8–0.9 mm. pressure. It has the structural formula

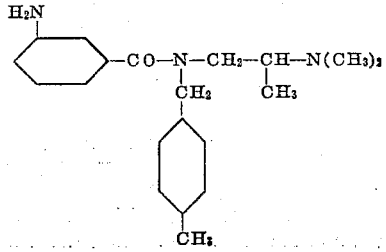

EXAMPLE 5

N-(β-diethylaminoethyl)-N-(α-phenethyl)-p-aminobenzamide

A solution of 240 parts of acetophenone in 220 parts of ethanol is treated with 232 parts of N,N-diethylethylenediamine and 150 parts of Raney nickel with slight warming. The mixture is then introduced into a Parr bomb and hydrogenated therein at about 130° C. and 500–600 pounds pressure for 6 hours. After cooling the contents of the bomb are filtered and the filtrate is submitted to vacuum distillation. The resulting N-(β-diethylaminoethyl)-α-phenethylamine is obtained at about 128–130° C. and 8 mm. pressure. 220 parts of this amine are heated with 200 parts of p-nitrobenzoyl chloride in 1800 parts of toluene for 2 hours at reflux temperature. The reaction mixture is then extracted with dilute hydrochloric acid and the extract is rendered alkaline by addition of potassium hydroxide and extracted with ether. This ether extract is dried over anhydrous potassium carbonate, filtered and evaporated to yield the N-(β-diethylaminoethyl)-N-(α-phenethyl)-p-nitrobenzamide as an oil.

A solution of 300 parts of this oil in 800 parts of ethanol is hydrogenated with 3 parts of platinum dioxide at 30 pounds pressure for 30 minutes and filtered. The filtrate is taken up in a mixture of ether and benzene and treated with somewhat more than one equivalent of alcoholic hydrogen chloride. The resulting precipitate of the hydrochloride of N-(β-diethylaminoethyl)-N-(α-phenethyl)-p-aminobenzamide is recrystallized from dilute isopropanol, using charcoal decolorization. This salt melts at about 190–191° C. with decomposition. The base has the structural formula

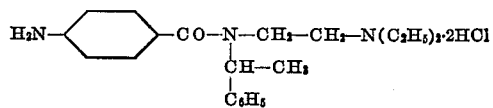

I claim:
1. A compound of the structural formula

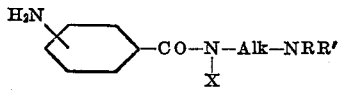

wherein Alk is a lower alkylene radical of at least two carbon atoms, R and R' are lower alkyl radicals and X is a member of the class consisting of aryl and aralkyl hydrocarbon radicals containing six to twelve carbon atoms.

2. A compound of the structural formula

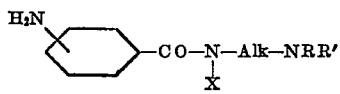

wherein Alk is a lower alkylene radical of at least two carbon atoms, R and R' are lower alkyl radicals, and X is an aryl hydrocarbon radical containing six to twelve carbon atoms.

3. A compound of the structural formula

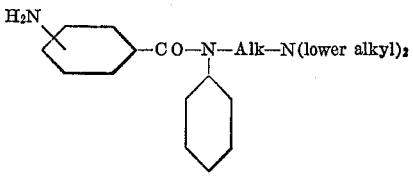

wherein Alk is a lower alkylene radical of at least two carbon atoms.

4. N-(β-diethylaminoethyl)-p-aminobenzanilide.

5. A compound of the structural formula

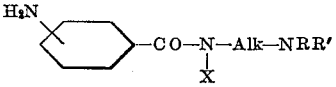

wherein Alk is a lower alkylene radical of at least two carbon atoms, R and R' are lower alkyl radicals, and X is an aralkyl hydrocarbon radical containing six to twelve carbon atoms.

6. A compound of the structural formula

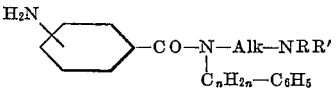

wherein Alk is a lower alkylene radical of at least two carbon atoms, R and R' are lower alkyl radicals and n is an integer between 1 and 6 inclusive.

7. A compound of the structural formula

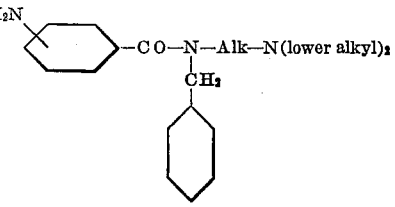

wherein Alk is a lower alkylene radical of at least two carbon atoms.

8. N-(β-diethylaminoethyl)-N-benzyl-p-aminobenzamide.

9. A compound of the structural formula

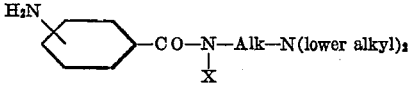

wherein Alk is a lower alkylene radical of at least two carbon atoms and X is a phenethyl radical.

10. N-(β-diethylaminoethyl)-N-phenethyl-p-aminobenzamide.

JOHN W. CUSIC.

References Cited in the file of this patent

FOREIGN PATENTS

| Number | Country | Date |
|---|---|---|
| 368,590 | Great Britain | Mar. 10, 1932 |
| 500,476 | Great Britain | Feb. 6, 1939 |